(12) United States Patent
Gail et al.

(10) Patent No.: US 7,171,585 B2
(45) Date of Patent: Jan. 30, 2007

(54) DIAGNOSING FAULTS AND ERRORS FROM A DATA REPOSITORY USING DIRECTED GRAPHS

(75) Inventors: H. Richard Gail, Ossining, NY (US); Sidney L. Hantler, Cortlandt Manor, NY (US); George B. Leeman, Jr., Ridgefield, CT (US); Meir M. Laker, Spring Valley, NY (US); Daniel Milch, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/723,751

(22) Filed: Nov. 26, 2003

(65) Prior Publication Data

US 2005/0132253 A1   Jun. 16, 2005

(51) Int. Cl.
*G06F 11/00* (2006.01)

(52) U.S. Cl. .............................. 714/25; 714/27; 714/47
(58) Field of Classification Search ................. 714/25, 714/27, 47
See application file for complete search history.

(56) References Cited

U.S. PATENT DOCUMENTS

| 6,357,017 | B1 * | 3/2002 | Bereiter et al. | ............... 714/27 |
| 2003/0115510 | A1 * | 6/2003 | Takayama | .................... 714/47 |
| 2003/0177414 | A1 * | 9/2003 | Pillutla et al. | ................ 714/25 |
| 2004/0019900 | A1 * | 1/2004 | Knightbridge et al. | ........ 725/23 |

* cited by examiner

*Primary Examiner*—Charles Ehne
(74) *Attorney, Agent, or Firm*—Louis P. Herzberg (57) ABSTRACT

Faults and errors are diagnosed from a repository of directed graphs. Subsets of all the possible questions and answers in the fault diagnosis process are encoded as directed graphs. Downloading subsets from a repository to a remote user substantially reduces the number of transmissions between the user and the repository.

22 Claims, 3 Drawing Sheets

DIAGNOSING FAULTS AND ERRORS FROM A DATA REPOSITORY USING DIRECTED GRAPHS

FIELD OF THE INVENTION

The present invention is directed to fault diagnosis from a data repository and, more particularly, to encoding subsets of possible questions and answers of the repository as directed graphs, and when the repository is remote from the user, downloading the subsets to substantially reduce the number of transmissions between the user and the remote repository.

BACKGROUND DESCRIPTION

Fault diagnosis can be accomplished by several techniques, including decision trees, case based analysis, and Bayesian networks. Each of these techniques requires narrowing the set of possible causes and solutions by answering a series of questions. When the information is stored in a remote data repository, considerable time is spent transmitting questions and subsequent answers between the user and the data repository.

A fault diagnosis session consists of the user responding to a series of questions (or sets of questions). The response to each question (or set of questions) reduces the set of possible causes of the fault and determines the next question (or set of questions) to be posed. This process repeats until one of the following conditions is true:

the number of possible causes of the fault is reduced to one (in which case, the cause is uniquely determined);

the number of possible causes of the fault is reduced to zero (in which case, the cause cannot be determined); or no further questions are available that will further reduce the number of causes (in which case, there remain multiple possible causes of the fault).

Each cycle of the diagnosis session has the following three steps:

(1) Select a question (or set of questions) to present to the user and determine the set of acceptable user responses. Note that the specific algorithm used to select one question (or set of questions) from the many potential questions distinguishes the various approaches to the problem known as case based reasoning, Bayesian networks, decision trees, etc. The specific approach is not important to the subject invention; any question selection algorithm may be employed. Similarly unimportant to the subject invention is the particular weighting scheme or measure employed to evaluate each potential question's suitability to be posed next.

(2) Present the selected question (or set of questions) to the user along with a description of the set of acceptable responses. Note that depending on the number of acceptable responses, various presentation methods may be employed to prompt the user's response. If the number is small, the system might display an itemized list of all acceptable responses as tokens or icons for the user to select. If the list is large, the system might display a text entry field for free-form entry of the response along with a description of the set of acceptable responses. With free-form entry, a parser and validation function must establish that the user's response is valid. The present invention extends to all methods of describing the valid set of responses and all methods of presenting them to the user for selection.

(3) Collect the User's Response.

The basic unit of communication between the system and user in step (2) of the diagnosis session is the question to be posed and the set of potential valid answers to the question. The basic unit of communication between the user and system in step (3) of the diagnosis session is the user's actual response.

The question selection process in step (1) may require, as input, a list of all previously posed questions along with the actual user response to each question. These question-answer pairs form the current state of the process.

The question selection process in step (1) also requires as input:

a set of possible causes of faults;

a set of questions that can be posed to the user to diagnose the fault; and a set of valid answers for each question.

In the most trivial scenario, one pass through the process, selecting and presenting one question (and establishing one question-answer pair), will suffice to resolve the fault. However, most scenarios will require at least one more pass through the process with a follow-up question (establishing an additional question-answer pair) prior to resolving the fault. In the general scenario, this process will repeat many times, presenting a new question-answer set to the user each time (and establishing an additional question-answer pair each time) before reaching one of the terminal conditions listed above.

When the database, the question selection algorithm, and the presentation method all reside on one dedicated single-user machine, latency due to data flows between the system and user are minimized. There are no network dependencies to slow the session (or cause it to completely fail) as data moves between the system and user. Similarly, state information is directly available to all steps of the process. The drawback to the single-user solution is the potentially large database of faults, questions, and answers that must be downloaded to the stand-alone client. The latency due to downloading and installing a large database may more than offset the gains of local data flows.

In contrast to the single-client solution, the standard client-server solution places the database and all three steps of the fault diagnosis process upon the server. It offloads to the client only the extremely simple sub-tasks of displaying the question and potential answers (all pre-formatted on the server) and capturing the user's selection. Due to the simplistic use of the client, client-server solutions do not generally allow users to enter free-form text since this requires a sophisticated set of processing functions (parser, validation, and error processing functions) to ensure the user enters valid text. Instead, all valid responses must be enumerated explicitly by the server. This can be awkward when the set of valid responses is large (e.g., all valid twelve digit error codes).

Since the database and all three steps of the fault diagnosis process reside on the server, standard client-server solutions transmit one question (and its accompanying set of valid responses) from the server to the client during each pass through the process. The user's choice is transmitted back to the server, which then repeats the process, selecting a new question and sending it again to the client. Thus, each pass through the process requires two network transmissions and one server interaction.

This results in 2n network transmissions and n server processes for n question-answer interactions. The many server interactions slow server response and impede scalability to multiple users. The many network transmissions further slow response to the user, in addition to increasing the number of opportunities for failure in the middle of the session. Additionally, the process state information must either be transmitted with each interaction (further slowing response) or be stored on the server (further impeding server scalability). Storing the process state information on the server also means that this information must eventually be cleaned up, creating time-out problems for clients who have taken a break in the middle of a fault diagnosis session.

SUMMARY OF THE INVENTION

It is therefore an object of the present invention to provide a fault diagnosis technique which reduces latency due to downloading and installing a large database and also reduces the number of transmissions between user and the remote repository. According to the present invention, the necessity for transmitting each question and answer is reduced or eliminated and, by encoding the questions and answers, the latency is reduced. The present invention places all three steps of the process on the client, gaining all of the advantages of the single-client solution. However, it avoids the single-client solution drawback of the potentially large database download by downloading portions of the database onto the client as needed. These portions are significant enough in size to allow the process to run through many passes without returning to the server, but small enough to avoid delays in the diagnosis session due to the network latency. This substantially reduces the number of network transmissions and server interactions needed during a diagnosis session. It results in substantially better performance for the user and much better scalability for the server.

The technique comprises encoding the complete set of symptoms and diagnoses of the system as a graph, subdividing this graph into multiple subgraphs, and then loading subgraphs only as needed to continue with a diagnosis session.

An example embodiment of this invention uses Java classes to store the graphs of the repository, load them on demand, and download them when the repository is remote. The object oriented nature of Java supports the aggregation and encoding of commonly occurring sequences of question-answer pairs and related symptoms and diagnoses into one Java class. Java's ability to dynamically load additional object code at run-time as Java classes (a quality known as "late-binding") supports the incremental loading of additional graphs as needed. And when the repository is remote, Java's ability to remotely download a class (or package of classes) in one transmission minimizes network interactions needed to retrieve subsequent question-answer pairs.

Another example embodiment of this invention uses the dynamically downloadable quality of Java to dynamically move the question selection algorithm to the client from the server, offloading the processing from the server and obviating the return trip to the server for its processing ability. Similarly, the presentation functions are moved to the client, allowing sophisticated client-side validation of free-form text entry with no server interaction.

Another example embodiment uses code generated by any other programming language, especially if the programming language is object oriented and supports late binding and on-demand downloading of classes as does Java.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE INVENTION

The present invention provides methods, systems and apparatus for fault diagnosis which reduces latency due to downloading and installing a large database and reduces the number of transmissions between user and the remote repository. The necessity for transmitting each question and answer is reduced or eliminated and, by encoding the questions and answers, the latency is reduced. The present invention places all the steps of the process upon the client, gaining all of the advantages of the single-client solution. However, it avoids the single-client solution drawback of the potentially large database download by downloading portions of the database onto the client as needed. These portions are significant enough in size to allow the process to run through many passes without returning to the server, but small enough to avoid delays in the diagnosis session due to the network latency. This substantially reduces the number of network transmissions and server interactions needed during a diagnosis session, and results in substantially better performance for the user and much better scalability for the server.

An example of a method comprises encoding the complete set of symptoms and diagnoses of the system as a graph, subdividing this graph into multiple subgraphs, and then loading subgraphs only as needed to continue with a diagnosis session.

A fault diagnosis session begins with the receipt of a description of the fault as a set of symptoms. This description may be used by any appropriate method (e.g., a method which indexes subgraphs by the symptoms they encode) to determine an appropriate subgraph to load with which to begin the diagnosis session. If no method has been defined or if the method fails to map the description to a unique subgraph, a previously designated default subgraph may be loaded to begin the session or the user may simply be prompted to choose a subgraph based on descriptions provided to the user of subgraphs which may serve as starting points.

If a diagnosis is immediately evident from the symptoms so far received, the currently loaded subgraph encodes this as a terminal node labeled with the diagnosis. Otherwise, further symptoms need to be received to diagnose the fault. The subgraph directs the probing for the next symptom, encoding the symptom as a node (representing a question that can be asked) and one or more edges leading from the node (each representing an acceptable answer to the question) to another node in the subgraph where the processing repeats as above until a diagnosis is found. An entirely new area of probing is encoded in the subgraph by a node linking from this subgraph to another subgraph, causing the new subgraph to be loaded and processed as just described.

Figure 1:
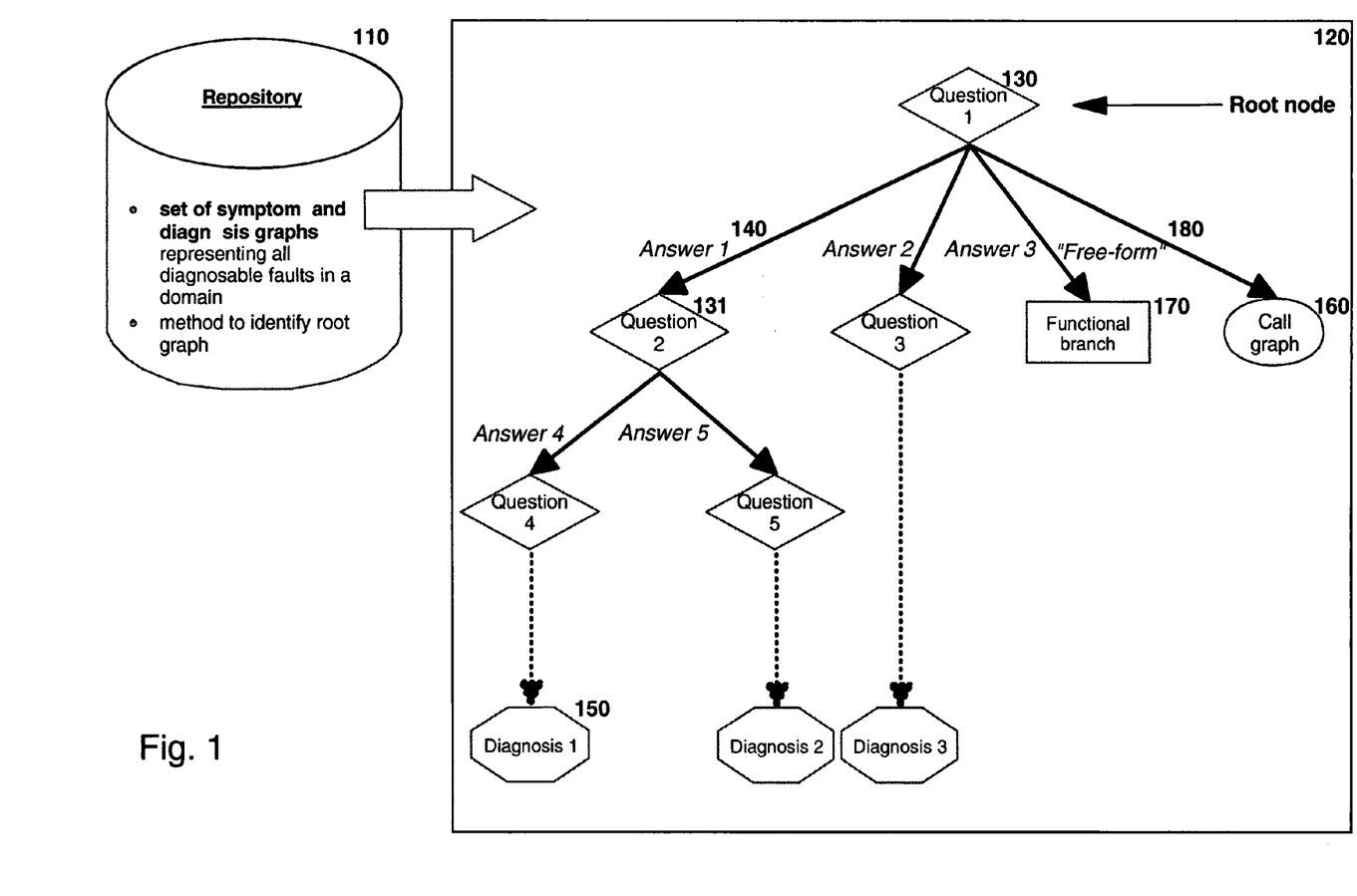
FIG. 1 is a block diagram of a repository of directed graphs which taken together encode the symptoms and diagnoses of the fault diagnosis system of the subject invention.

Referring now to the drawings, and more particularly to FIG. 1, there is shown a block diagram of a repository of multiple graphs which encodes all of the known symptoms and faults of the target system being diagnosed. Database block 110 represents the complete repository of graphs and block 120 is the expansion of a typical graph of symptoms and faults in the repository. Although the method used to map symptoms and faults to particular graphs is not dictated by the subject invention, several organizational methods are typical: a graph might encode a subset of related symptoms that tend to co-occur in a diagnosis session or it might encode a set of related faults. Commonly, a subgraph will fully diagnose one particular subsystem of the overall faulty target system.

Each symptom in the graph comprises a question about the state of some attribute in the faulty system and an answer to the question representing the value of that attribute. Questions are encoded in the graph as nodes of type question and represented in FIG. 1 by diamond shaped nodes (e.g., nodes 130 and 131). Answers are encoded in the graph and represented in FIG. 1 by labeled edges leaving a node of type question (e.g., edge 140). A symptom is therefore encoded as a node of type question and an answer edge from the node (e.g., node 130 and edge 140 taken together encode a symptom). Each answer edge leads either to another node of type question (e.g., node 130 leads to node 131 via edge 140), representing the next question to pose in the fault diagnosis session, or to one of several additional types of nodes:

- a node of type diagnosis (hexagon shaped in FIG. 1, e.g., node 150), representing one definitive diagnosis of the fault and optionally supplying an action plan to remedy the fault,
- a node of type call-graph (round shaped in FIG. 1, e.g., node 160), connecting one graph to another graph, allowing composition of graphs, or
- a node of type functional-branch (rectangle shaped in FIG. 1, e.g., node 170), allowing a transfer of control to any other node in the current graph where the new node is the computed value of a function (associated with the functional-branch node) of the current state of the diagnosis session, where the current state is represented by the set of all <question, answer> pairs formed from questions already answered in the current session.

Some embodiments may use additional node types to encode additional information useful in directing fault diagnosis operations. For example:

- a node of type test performs a test (or directs the user to perform a test) on the faulty system to obtain an answer to a question,
- a node of type lookup obtains an answer to a question by querying a source of information external to the diagnostic process and the user (e.g., a remote database), and
- a node of type state-transformation modifies the current state by applying a function associated with the state-transformation node to the current state to modify the current state. This allows various forms of reasoning to be added to the diagnosis system, e.g., adding additional <question, answer> pairs to the current state based on the presence of symptoms already received is a form of automatic deduction of new symptoms.

Each of these additional node types would have non-labeled edges connecting them directly to the next node in the graph to be processed. Some embodiments may therefore choose to encode the information included in them directly as part of the next node rather than adding additional node types to the graph.

While the answer edges leading from a node of type question determine a set of enumerable answers to the question, some questions may not allow an easily enumerable set of answers, either because the set of answers is continuous or it is discrete but very large. To accommodate this situation, in some embodiments, an edge may be designated as free-form (e.g., edge 180), allowing any value to be the question's answer. Some embodiments may further allow an optional validation function to be associated with a free-form edge to restrict the values to a set computable by the validation function.

One node of type question in each graph is designated the root node (node 130 in the diagram), creating a rooted and directed graph of symptoms and diagnoses. Typically (but not required by this invention), one graph that connects to all other graphs (even if only indirectly via other graphs), using multiple call-graph nodes, will be designated the root graph, thereby forming one large rooted directed graph of subgraphs capable of diagnosing all known faults of the target system. If no graph is designated as the root, then an auxiliary index (keyed on the root question node of at least one graph) might be used to access a dynamically selected root graph with which to begin a diagnosis session.

Figure 2:
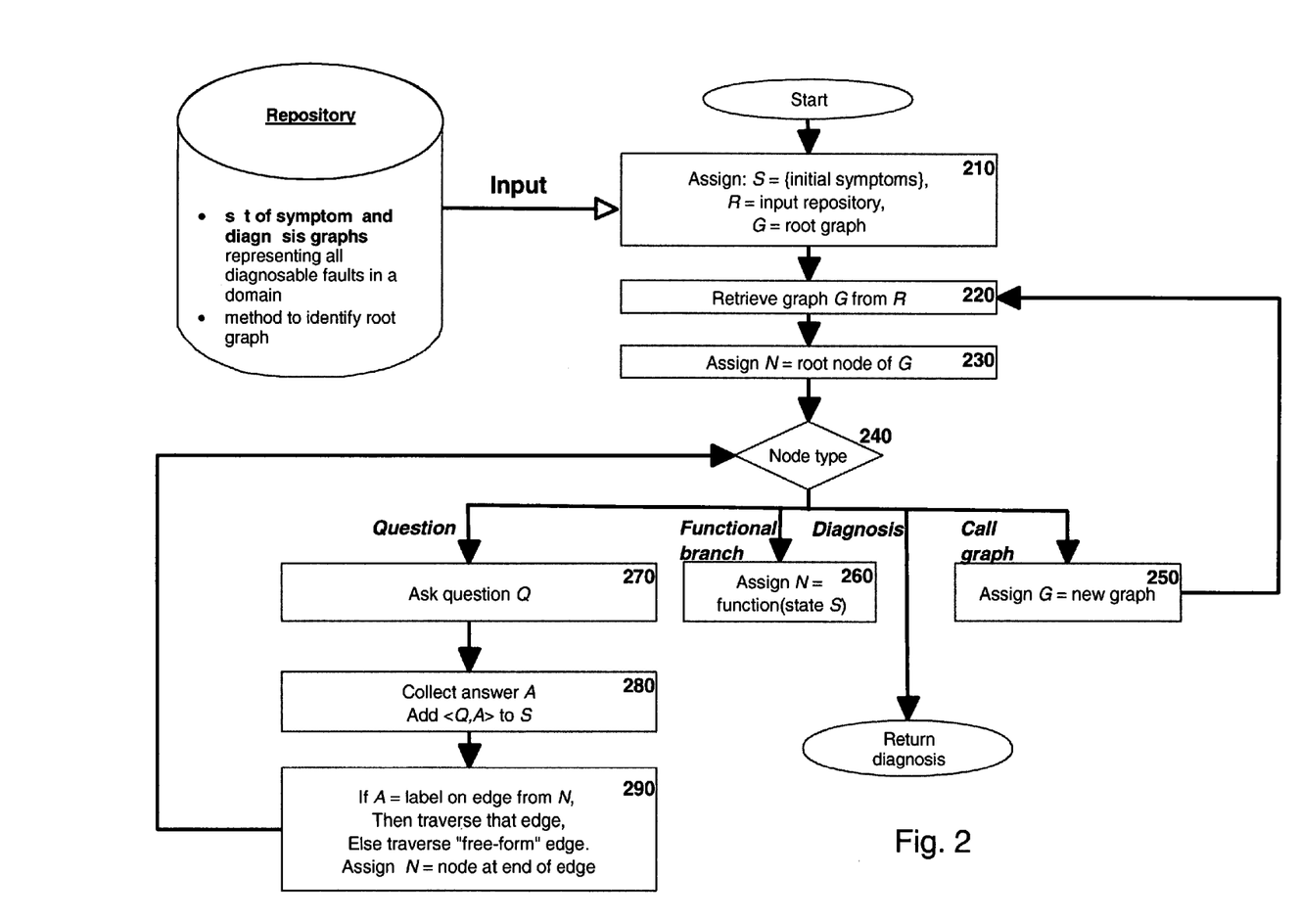
FIG. 2 is a flow diagram showing the logic of the fault diagnosis system of the subject invention employing the repository of FIG. 1 during a fault diagnosis session.

Referring now to FIG. 2, there is shown a flow diagram of the logic of the process of fault diagnosis using the repository of directed graphs of FIG. 1 according to the invention. The input to the process is the repository of all directed graphs diagnosing faults of a system.

In the following description, the following definitions are used:

R is the repository of all directed graphs diagnosing faults of a system.
G is the current directed graph being processed.
N is the current node being processed.
Q is the current question being posed.
A is the answer to the current question Q.
S is the current state of the diagnosis session, a set of pairs of the form <question, answer>, where there is one pair for each question already answered in the session.

The process begins in function block 210 by receiving a set of symptoms as an initial description of the fault being diagnosed, setting the current state S to be those symptoms, identifying one graph from the repository R which will serve as the root graph and initializing current graph G to be that graph. As described above, any method may be used to identify a root graph, e.g., indexing the graphs by initially received symptoms or simply designating one graph from which all other graphs can be reached. Graph G is then retrieved from the repository in function block 220. In function block 230, N is initialized to be the root node of graph G. The node type of N is identified in decision block 240. If N is of type diagnosis, then the process returns the contents of the node as the diagnosis of the fault. If the current node type is not of type diagnosis then one performs a particular node type operation. The particular node type operation is dependent upon the node type identified in the step of identifying the node type of the current node. This is repeated until the node type of the current node is of type diagnosis.

If N is of type call-graph, then, in function block 250, G is set to be the graph associated with the call-graph node and processing continues iteratively with this new graph at function block 220. If N is of type functional-branch, then, in block 260, the function associated with the functional-branch node is evaluated over the current state S of the diagnosis session and the value of the function is assigned to N. The overall process continues iteratively with this new node at decision block 240. Otherwise, N is of type question, in which case Q is set to be the current question which is posed in function block 270, A is set to the answer to the question which is collected in function block 280, and state S of the session is updated with a pair of the form <Q, A>.

In addition to directly asking the user for the answer to the question, different embodiments of the invention might use some combination of additional node types (e.g., those described above: test, lookup, and state-transformation) to answer the question by performing a test on the faulty system, querying a source external to the faulty system, or deducing the answer from symptoms already received. In function block 290, the edge of the graph leaving N which is labeled with answer A is traversed to reach a new node in G, N is initialized to be this new node, and processing continues iteratively with this new node at decision block 220. If no node is labeled A but there is a free-form edge, that edge is traversed to reach the new node as above.

Figure 3:
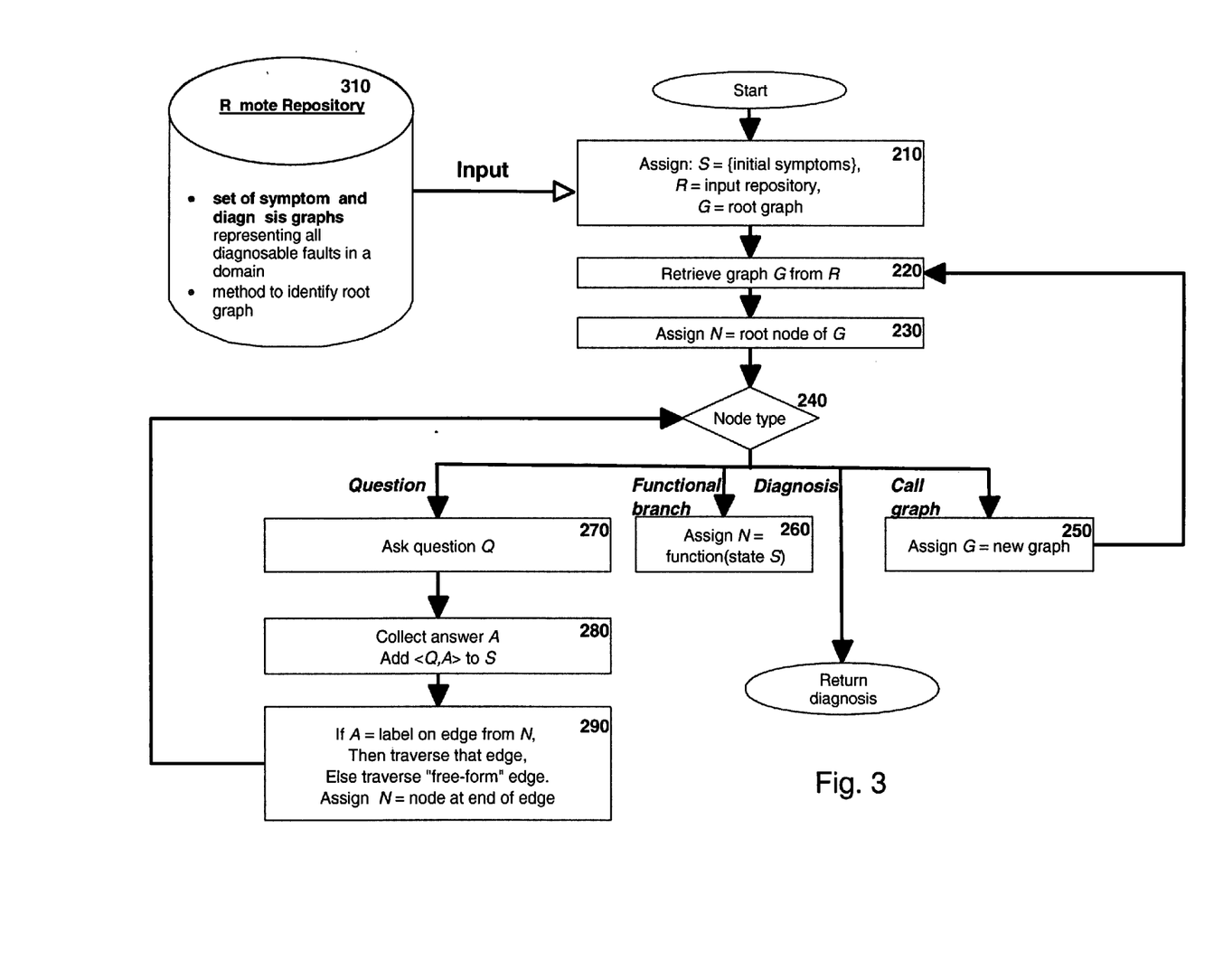
FIG. 3 is an example of a block diagram of placement of system components in another embodiment of the subject invention when the repository is remote and directed graphs are downloaded as needed to a local agent running the logic of the fault diagnosis system.

Referring now to FIG. 3, there is shown a block diagram of the system components according to the invention when the repository of directed graphs is remote from the process running the logic of the fault diagnosis system. Database block 310 is the remote repository R including the complete set of directed graphs which taken together encode the symptoms and diagnoses of the fault diagnosis system. The rest of FIG. 3 is the logic of the fault diagnosis system which resides in the local agent. The logic is identical to that of FIG. 2 (and is therefore labeled identically as in FIG. 2) with two exceptions. Function block 210 of FIG. 3, which asks the repository to identify a root graph based on the initially described symptoms, now incorporates logic to ask it remotely at a known or discoverable location. Similarly, function block 220 of FIG. 3, which retrieves a given graph for processing by the diagnosis logic, must now incorporate logic to retrieve it remotely from the same known or discoverable location. Once a graph is retrieved, it is processed normally according to the prior description of FIG. 2.

An example embodiment of this invention uses Java classes to store the graphs of the repository, load them on demand, and download them when the repository is remote. The object oriented nature of Java supports the aggregation and encoding of commonly occurring sequences of question-answer pairs and related symptoms and diagnoses into one Java class. Java's ability to dynamically load additional object code at run-time as Java classes (a quality known as "late-binding") supports the incremental loading of additional graphs as needed. And when the repository is remote, Java's ability to remotely download a class (or package of classes) in one transmission minimizes network interactions needed to retrieve subsequent question-answer pairs.

In another embodiment, code generated by any other programming language is used, especially if the programming language is object oriented and supports late binding and on-demand downloading of code as does Java in the previously described embodiment.

In another embodiment, the repository is downloaded as needed onto a "small" device (i.e., a device with very limited memory, e.g., a PDA or cell-phone). By way of example, this is useful for on-site diagnosis of systems in the field without requiring dispatched field engineers to bring complete manual sets or large repositories of diagnostic information. In addition to receiving the diagnostic information in small chunks, the information received is also current as of the time of the download.

In another embodiment, the repository is hosted by a service provider, supporting the diagnostic procedures of a plurality of customers in a self-service mode, downloading graphs as needed from the service provider's hosting repository (via the Internet, for example).

In similar embodiments, the customer performing the diagnosis is replaced by a customer support center performing the diagnosis on behalf of its own customers, by a field representative on-site with the failing system, or by the faulty system itself in a self-diagnostic mode. The latter usage enables autonomic behavior, especially when the faulty system can take action to apply the solution ("self-heal") identified by the fault diagnosis system.

In another embodiment, the repository is used in an "on-demand" environment with the service provider charging each customer for the amount of resources consumed during the diagnosis session. In this environment, the number of graphs downloaded on-demand from the repository is a metric of system usage. When the embodiment of the invention also incorporates one object-oriented class per graph (as mentioned above), the metric reduces to the number of classes downloaded on-demand.

Thus the methods and systems of the present invention are suitable for e-business on demand, which includes providing customer services.

In another embodiment, the system being diagnosed is a machine, possibly a complex machine (e.g., a computer processor or an automobile) or a complex component (e.g., an automobile engine), although it might be a simpler machine or component (e.g., a refrigerator door that does not close completely).

In similar embodiments, the system being diagnosed is either a software system or a process, either complex (e.g., a computer operating system that has failed or a sales presentation that failed to result in a successful sale) or simple (e.g. a child's computer game that does not install properly).

In another embodiment, the diagnostic system is being used in a proactive manner to prevent faults before they occur (e.g., helping a customer to choose, or training a salesperson to sell, an appropriate product from a line of products that can be tailored to multiple uses; helping or training someone to install or configure hardware or software; or, helping a word processor user to format a document in a particular way). In this embodiment, the diagnostic system is also known as a help system or a training system and is particularly useful for customer self-help and employee self-training. Coupled with other features of the invention already mentioned, these users can be remote from the repository and be using even small devices for the training or help. Downloading graphs on demand also assures the latest content and style of interaction deemed useful by the content provider or service provider of the diagnostic, help, or training system for the target audience.

Thus, the invention provides a method for diagnosing from a repository at least one fault in a system, the repository represented as a directed graph having one or more undivided directed subgraphs. In an example embodiment of a method for diagnosing comprising the steps of: receiving a first description of the at least one fault; employing the first description to identify a response from the repository; if the response is a diagnosis stopping, otherwise identifying at least one subgraph responsive to the first description; using the at least one subgraph in determining the diagnosis, stopping if the diagnosis results, otherwise forming a modified description based upon the at least one subgraph; and replacing the first description with the modified description and repeating the steps of receiving, employing, identifying and using until the diagnosis results.

In some embodiments of the method: the first description is completely covered by the diagnosis, further comprising implementing a solution based on the diagnosis; and/or the first description includes a set of symptoms describing the at least one fault; and/or wherein the modified description includes an additional set of symptoms identified for probing by the subgraph; and/or the first subgraph is identified by a method employing an index mapping descriptions to initial subgraphs, the trivial index simply mapping all descriptions to one subgraph; and/or the repository is remote and the undivided subgraphs are downloaded from the repository to a local agent performing the diagnosis as needed; and/or the system is a machine, a software program, a process, or any combination of these; and/or each undivided subgraph is implemented as executable code; and/or the executable code is written in an object-oriented programming language, and/or a programming language that supports late binding, and/or a programming language that supports on-demand downloading of classes; and/or the executable code is written in Java; and/or the local agent is a machine; and/or the diagnostic system is being used in a proactive manner to prevent faults before they occur as in a help or training system; and/or the remote repository is downloaded as needed onto a "small" device (i.e., a device with very limited memory); and/or the remote repository is hosted by a service provider supporting a plurality of customers with each customer downloading subgraphs as needed to perform diagnosis; and/or at least one of the customers is a customer support center diagnosing faulty systems on behalf of a plurality of its own customers; and/or the customer is a field representative performing diagnosis of a failing system; and/or the customer is a faulty system operating in a self-diagnostic mode; and/or the faulty system applies the solution identified by the fault diagnosis system in a "self-healing" mode.

In some embodiments, the invention is an article of manufacture comprising a computer usable medium having computer readable program code means embodied therein for causing diagnosis from a repository of at least one fault in a system, the computer readable program code means in the article of manufacture comprising computer readable program code means for causing a computer to effect the steps of method of the present invention.

In some embodiments, the invention is a program storage device readable by machine, tangibly embodying a program of instructions executable by the machine to perform method steps for diagnosing from a repository at least one fault in a system.

In some embodiments, the invention is an apparatus comprising means for diagnosing from a repository at least one fault in a system. The repository is represented as a directed graph having one or more undivided directed subgraphs, the means for diagnosing comprising: means for receiving a first description of the at least one fault; means for employing the first description to identify a response from the repository; means for if the response is a diagnosis stopping, otherwise identifying at least one subgraph responsive to the first description; means for using the at least one subgraph in determining the diagnosis, stopping if the diagnosis results, otherwise forming a modified description based upon the at least one subgraph; and means for replacing the first description with the modified description and repeating the steps of receiving, employing, identifying and using until the diagnosis results.

While the invention has been described in terms of particular embodiments, those skilled in the art will recognize that the invention can be practiced with modification within the spirit and scope of the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method comprising diagnosing from a data repository at least one fault in a system, said data repository represented as a directed graph having one or more undivided directed subgraphs, the step of diagnosing comprising the steps of:

receiving a first description of said at least one fault;

employing said first description to identify a response from the said data repository;

if the response is a diagnosis stopping, otherwise identifying at least one subgraph responsive to said first description;

using said at least one subgraph in determining said diagnosis, stopping if said diagnosis results, otherwise forming a modified description based upon said at least one subgraph; and replacing said first description with said modified description and repeating the steps of receiving, employing, identifying and using until said diagnosis results.

2. A method as recited in claim 1, wherein the first description is completely covered by the diagnosis, the method further comprising implementing a solution based on the diagnosis.

3. A method as recited in claim 1, wherein the first description includes a set of symptoms describing said at least one fault.

4. A method as recited in claim 3, wherein the modified description includes an additional set of symptoms identified for probing by the subgraph.

5. A method as recited in claim 1, wherein the first subgraph is identified by a method employing an index mapping descriptions to initial subgraphs, the trivial index simply mapping all descriptions to one subgraph.

6. A method as recited in claim 1, wherein said data repository is a remote data repository and said undivided subgraphs are downloaded from said data repository to a local agent performing the diagnosis as needed.

7. A method as recited in claim 1, wherein said system is a system taken from a group of systems consisting of: a machine; a software program; a process; and any combination of these.

8. A method as recited in claim 1, having at least one limitation taken from a group of limitations consisting of:

wherein each said undivided subgraph is implemented as executable code;

wherein said executable code is written in an object-oriented programming language;

wherein said executable code is written in a programming language that supports late binding;

wherein said programming language supports late binding and on-demand downloading of classes;

wherein said programming language that is object-oriented and supports late binding and on-demand downloading of classes is Java;

wherein said local agent is a machine;

wherein said remote data repository is downloaded as needed onto a small computing device;

wherein said remote data repository is hosted by a service provider supporting a plurality of customers and having each customer download subgraphs as needed to perform diagnosis;

wherein at least one of said customers is a customer support center diagnosing faulty systems on behalf of a plurality of its own customers;

wherein said customer is a field representative performing diagnosis of a failing system;

wherein said customer is a faulty system operating in a self-diagnostic mode; and wherein said faulty system applies the solution identified by the fault diagnosis system in an autonomic, self-healing mode; and any combination of these limitations.

9. A method as recited in claim 1, wherein said diagnosing is done proactively to prevent faults from occurring in the future and/or to train someone to use said system successfully so that faults will not occur.

10. A method as recited in claim 1, wherein said data repository enables an on-demand fault diagnosis system with a service provider charging each customer for an amount of resources consumed during any diagnosis session.

11. An article of manufacture comprising a computer usable medium having computer readable program code means embodied therein for causing diagnosis from a data repository of at least one fault in a system, the computer readable program code means in said article of manufacture comprising computer readable program code means for causing a computer to effect the steps of claim 1.

12. A program storage device readable by machine, tangibly embodying a program of instructions executable by the machine to perform method steps for diagnosing from a data repository at least one fault in a system, said method steps comprising the steps of claim 1.

13. An apparatus comprising means for diagnosing from a data repository at least one fault in a system, said data repository represented as a directed graph having of one or more undivided directed subgraphs, the means for diagnosing comprising:

means for receiving a first description of said at least one fault;

means for employing said first description to identify a response from the said data repository;

means for if the response is a diagnosis stopping, otherwise identifying at least one subgraph responsive to said first description;

means for using said at least one subgraph in determining said diagnosis, stopping if said diagnosis results, otherwise forming a modified description based upon said at least one subgraph; and means for replacing said first description with said modified description and repeating the steps of receiving, employing, identifying and using until said diagnosis results.

14. A computer program product comprising a computer usable medium having computer readable program code means embodied therein for causing diagnosis from a data repository of at least one fault in a system, the computer readable program code means in said computer program product comprising computer read program code means for causing a computer to effect the functions of claim 13.

15. A method for diagnosing a fault, said method comprising:

commencing a diagnosis session;

initializing a current state, the current state being symptoms comprising an initial description of a fault being diagnosed;

identifying one graph from a data repository of graphs which, when taken together, encode symptoms and diagnoses of a system, and assigning said one graph to be the current graph;

retrieving said current graph from the data repository;

assigning one node of the current graph to be the current node;

identifying the node type of the current node; and if the current node is of type diagnosis, then returning the diagnosis associated with the node as the diagnosis of the fault;

if the node type is not of type diagnosis then performing a particular node type operation, and repeating the step of identifying the node type of the current node, until the node type of the current node is of type diagnosis.

16. A method as recited in claim 15, wherein the step of identifying one root graph comprises employing indexing graphs by symptoms.

17. A method as recited in claim 15, wherein:

the data repository of directed graphs is a remote data repository, remote from a process running the fault diagnosis session, said remote data repository comprising a complete set of directed graphs which taken together encode the symptoms and diagnoses of the fault diagnosis system;

the step of identifying one graph incorporates logic to remotely ask the data repository to identify one graph at a known or discoverable location; and the step of retrieving incorporates logic to retrieve remotely from said known or discoverable location.

18. An article of manufacture comprising a computer usable medium having computer readable program code means embodied therein for causing diagnosis of a fault the computer readable program code means in said article of manufacture comprising computer readable program code means for causing a computer to effect the steps of claim 15.

19. A program storage device readable by machine, tangibly embodying a program of instructions executable by the machine to perform method steps for diagnosing a fault, said method steps comprising the steps of claim 15.

20. A method as recited in claim 15, wherein said data repository enables an on-demand fault diagnosis system with a service provider charging each customer for an amount of resources consumed during any diagnosis session.

21. A method as recited in claim 15, wherein:

if the current node is of type call-graph, then the step of performing a particular node type operation includes setting the current graph to be a graph associated with the call-graph node, and repeating the steps of retrieving and assigning;

if the current node is of type functional-branch, then the step of performing a particular node type operation includes evaluating a function associated with the functional-branch node over the current state of the diagnosis session, and assigning the value of the function to be the current node;

if the current node is of type question, then the step of performing a particular node type operation includes asking a question associated with the current node, collecting an answer to the question, updating the current state with a pair having a form <question, answer>, traversing an edge labeled by the answer or by a function that accepts the value as being valid, reaching a new node in the current graph, and assigning the new node to be the current node;

if the current node type is of type test, then the step of performing a particular node type operation includes performing a test on the faulty system, adding additional symptoms to the current state based on the test results, traversing the edge leaving the current node to reach a new node and assigning the new node to be the current node;

if the current node type is of type lookup, then the step of performing a particular node type operation includes querying a source external to the diagnosis system and the user, adding additional symptoms to the current state based on the query results, traversing the edge leaving the current node to reach a new node and assigning the new node to be the current node; and if the current node type is of type state-transformation, then the step of performing a particular node type operation includes applying a function associated with the state-transformation node to the current state to modify the current state, traversing the edge leaving the current node to reach a new node and assigning the new node to be the current node.

22. A method as recited in claim 15, wherein:

a node of type diagnosis is a node representing one definitive diagnosis of the fault and optionally supplying an action plan to remedy the fault;

a node of type call-graph is a node connecting one graph to another graph, allowing composition of graphs;

a node of type functional-branch is a node which allows a transfer of control to any other node in the current graph where the new node is the computed value of a function (associated with the functional-branch node) of the current state of the diagnosis session, where the current state is represented by the set of all <question, answer> pairs formed from questions already answered in the current session; and a node of state-transformation is a node which allows modification of the current state by applying a function associated with the state-transformation node to the current state to modify it.

* * * * *